UNITED STATES PATENT OFFICE.

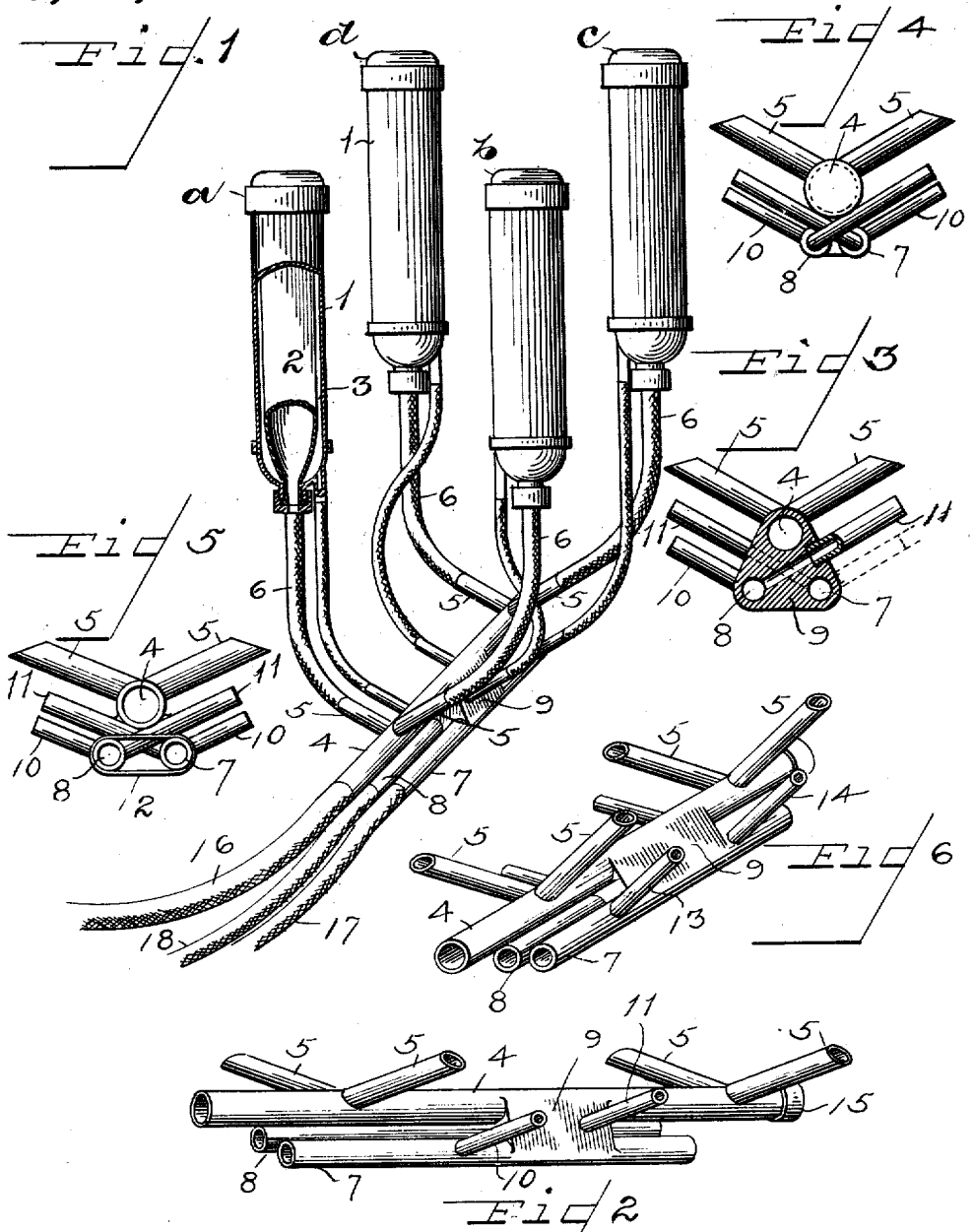
J. G. G. EKLUNDH.
TEAT CUP CLAW FOR MILKING APPARATUS.
APPLICATION FILED SEPT. 5, 1916.
1,263,347.
Patented Apr. 16, 1918.

JOHN G. G. EKLUNDH, OF COLUMBUS, OHIO.

TEAT-CUP CLAW FOR MILKING APPARATUS.

1,263,347.

Specification of Letters Patent.

Patented Apr. 16, 1918.

Application filed September 5, 1916. Serial No. 118,339.

*To all whom it may concern:*

Be it known that I, JOHN G. G. EKLUNDH, a subject of the King of Sweden, residing at Columbus, in the county of Franklin and State of Ohio, have invented certain new and useful Improvements in Teat-Cup Claws for Milking Apparatus, of which the following is a specification.

My invention relates to milking apparatus and more particularly to the ramified connection for the teat cups known generally as the "cluster" or "claw."

The object of the invention is to provide a cluster or claw which will not only be cheapened in construction, but will be more efficient in use, positive in operation, and unlikely to get out of repair.

A further object of the invention is to provide an improved form of cluster or claw adapted to so connect the teat cups with the suction apparatus as to more nearly imitate hand milking operations to produce a substantially continuous or uninterrupted flow of milk.

With the above primary and other incidental objects in view, as will more fully appear in the specification, the invention consists of the features of construction, the parts and combinations thereof, and the mode of operation, or their equivalents, as hereinafter described and set forth in the claims.

Referring to the drawings, Figure 1 is a perspective view of a group of teat cups connected one with the other and with the suction apparatus by the cluster or claw forming the subject matter hereof. Fig. 2 is a detail perspective view of the cluster or claw disconnected from the teat cups and suction apparatus. Fig. 3 is a transverse sectional view thereof. Fig. 4 is an end elevation of a modification of the construction shown in Figs. 1, 2 and 3. Fig. 5 is an end elevation of a further modification thereof. Fig. 6 is a detail perspective view showing a modified arrangement of the air connections whereby the teat cups of the group will be operated in parallel instead of diagonally, as hereinafter explained.

Like parts are indicated by similar characters of reference throughout the several views.

The cluster or claw construction forming the subject matter hereof is particularly adapted for use in conjunction with a suction pulsator of the double acting or alternating type such as is shown in copending application Serial No. 107457. Its use, however, is not limited to that particular style of alternating pulsator but may be used in conjunction with any suction means adapted to alternately exhaust the air conduits and teat cups connected therewith as hereafter described. The suction means or pulsator, *per se*, forms no part of the present invention.

The claw or cluster is further adapted for use in conjunction with teat cups of the pneumatic pulsating or vibratory type embodying in addition to the main suction chamber an auxiliary chamber to and from which air is alternately admitted and exhausted, thereby causing a vibratory action of the walls of the inner or suction chamber. While for purposes of illustration a teat cup has been shown in detail in the drawing, such teat cup, *per se*, forms no part of the present invention, but as at present advised will form the subject matter of a separate application.

Referring to the drawings, *a*, *b*, *c* and *d* are the teat cups comprising a single group which may be of any suitable construction of the pulsating or vibratory type. Such teat cups usually comprise a shell or housing 1, preferably of metal, within which is a flexible tubular suction chamber 2, preferably of rubber, rubberized fabric, or other flexible composition. This suction chamber 2 is so proportioned and located within the housing or shell 1 as to form an annular air chamber 3 intermediate the flexible walls of the suction chamber 2 and the walls of the housing 1. The suction chamber 2 is maintained under constant suction draft or partial vacuum. Air is alternately admitted to and exhausted from the chamber 3. The admission of air to the chamber 3 compresses or collapses the flexible walls of the suction chamber 2 which, as before stated, is maintained under partial vacuum. The exhaustion of the chamber 3 whereby the air pressure within the chamber 2 and the chamber 3 will equalize permits the flexible walls of the chamber 2 to expand or return to normal. The device forming the subject matter hereof is not limited to the particular style of teat cup shown in the drawings but may be used with any construction of pulsating. Heretofore such teat cups have been connected to operate in unison, *i. e.*, all four cups were arranged to be intermittently operated simultaneously. Thus the flow of milk through the milk conduit was intermittent, occurring in spurts or pulsations. The milk conduit is necessarily made sufficiently large under such circumstances to accommodate the simultaneous flow from four cups. In the approved method of hand milking the milking operations occur alternately. The present construction is designed to imitate the alternate hand operation usually employed. To this end instead of the four teat cups of the group being exhausted simultaneously and air admitted thereto simultaneously, the teat cups are separated into pairs which are alternately exhausted and relieved, i. e., one pair is exhausted while the other pair is relieved, and vice versa.

To this end the cluster or claw forming the subject matter hereof comprises the main or milk conduit 4 from which project the branch conduits 5—5—5 connected by flexible conduits 6 with the suction chambers 2 of the respective teat cups $a$, $b$, $c$, and $d$. Thus it will be seen that the main or milk conduit is common to all of the teat cups, each of which is in direct communication therewith. Extending parallel with the milk conduit 4 are a plurality of independent air conduits. In the present instance but two of these air conduits, 7 and 8, have been shown. It will be obvious, however, that if so desired an independent air conduit may be provided for each teat cup whereby the teat cups may be independently operated in succession. In the embodiment shown in the drawings each air conduit 7 and 8 is provided with two lateral branches 10 and 11 leading to the air chambers 3 of two teat cups whereby each air conduit 7 and 8 communicates with a pair of teat cups independent of the remaining pair. The branch conduits of the air conduits 7 and 8 are preferably oppositely disposed, two of which cross or extend transversely, as shown in Figs. 3, 4 and 5. By this means diagonally disposed teat cups are connected to the same air conduit and caused to operate in unison. Thus the teat cups $a$ and $c$ may be connected to one air conduit and the teat cups $b$ and $d$ connected to the other air conduit, thus operating one pair of diagonally disposed teat cups in unison and alternating the operation with the other pair of diagonally disposed teat cups.

Various methods may be employed for uniting or joining the several conduits and for arranging the lateral branches thereof. A preferable method is to provide a body or block 9 which may be of triangular form through which the conduits 4, 7 and 8 extend. This block or body serves to support the several conduits in fixed relation one with the other to form a unitary structure. Each of the conduits 7 and 8 is provided with a directly connected branch or arm as at 10 while the oppositely disposed or transversely arranged branch conduit 11 extends through the block or body 9, as indicated in the sectional view Fig. 3.

In lieu of this construction the crossed branches 11 may be connected to the ends of the conduits 7 and 8 and crossed in relation one with the other as shown in the end view, Fig. 4. In Fig. 5 there is shown a further modification in which the branches 10 and 11 connect directly with the respective conduits 7 and 8. In this form the conduits 7 and 8 with their lateral branches are assembled with the cross branches 11 resting upon the opposite conduit and the main or milk conduit 4 resting in the crotch formed by the branches 11. The several parts are united by brazing or soldering in the well known manner. As a further support to maintain the relationship of the several conduits a band or loop 12 may be employed to inclose two or, if so desired, all of the conduits heretofore mentioned.

While the several forms of apparatus shown in Figs. 3 to 5 are adapted for diagonal operation of the teat cups, it is to be understood that merely by rearrangement of the branches 10 and 11 the teat cups may be connected in parallel, i. e., the two teat cups at the right side may be operated in unison and alternately with the two teat cups at the left side. If so desired the teat cups may be separated transversely into pairs and the two rear teat cups operated in unison and alternately with the two forward teat cups. To effect this operation the lateral branches 13 and 14 of each conduit 7 and 8 extend in the same direction, i. e., the two branches 13 of the conduit 7 extend toward the right while the two branches 14 of the conduit 8 extend toward the left. Otherwise the arrangement and operation of the device is the same as before described.

To enable the milk conduit 4 to be thoroughly cleansed and sterilized and kept in a sanitary condition a removable closure cap 15 is provided for one end thereof which may be removed to enable a brush or other cleaning device to be passed entirely through the conduit. The conduit 4 is connected by a flexible hose connection 16 with the pail or receiver. The conduits 7 and 8 are connected by independent hose connections 17 and 18 with the suction means. By connecting the teat cups for alternate operation as herein described and thereby inducing a continuous flow of milk the milk conduit 4 and hose connection 16 may be of less capacity than is necessary when the four cups are operated in unison.

It is obvious that in lieu of pneumatic operation of the teat cups a liquid such as water, oil or other fluid or semi-fluid media may be injected into and exhausted from the cup chambers 3 through the conduits 7 and 8 and their ramifications. While for illustration the conduits 7 and 8 have been referred to as pneumatic conduits, it is to be understood that the invention is not so limited but it is to be understood as including any fluid or flexible operating media.

From the above description it will be apparent that there is thus provided a device of the character described possessing the particular features of advantage before enumerated as desirable but which obviously is susceptible of modification in its form, proportion, detail construction, or arrangement of parts, without departing from the principle involved or sacrificing any of its advantages.

While in order to comply with the statute the invention has been described in language more or less specific as to certain structural features, it is to be understood that the means and construction herein described comprise but one mode of putting the invention into effect and the invention is therefore claimed broadly in any of its possible forms or modifications within the scope of the appended claims.

Having thus described my invention, I claim:

1. In a milking apparatus of the character described, the combination with a group of fluid actuated teat cups, and an alternating pulsator, of a cluster or claw including a substantially straight milk conduit common to all the teat cups of the group, and a plurality of independent substantially straight conduits for actuating media arranged substantially in parallel relation with the milk conduit and communicating with different teat cups of the group.

2. In a milking apparatus of the character described, the combination with a group of fluid actuated teat cups, and an alternating pulsator, of a cluster or claw including a ramified milk conduit common to all the teat cups of the group, and independent parallel conduits connecting the teat cups with the pulsator for alternating operation.

3. In a milking apparatus of the character described, the combination with two pairs of fluid actuated teat cups and an alternating pulsator, of a cluster or claw including a milk conduit common to all of said teat cups and an independent conduit for actuating fluid extending parallel with the milk conduit communicating with the teat cups comprising each pair and separately connected with the pulsator for alternate operation.

4. In a milking apparatus of the character described, a claw or cluster including a ramified milk conduit and a plurality of independent substantially parallel ramified pneumatic conduits, substantially as and for the purpose specified.

5. In a milking apparatus of the character described, a claw or cluster including a milk conduit, a plurality of independent conduits for teat cup actuating media, and oppositely disposed branch conduits projecting from said independent conduits.

6. In a milking apparatus of the character described, a claw or cluster including a milk conduit, a plurality of independent conduits for teat cup actuating media, and branch conduits extending in opposite directions from the adjacent sides of the said independent conduit in transverse relation one with the other forming a crotch in which the milk conduit is located.

In testimony whereof, I have hereunto set my hand this 26 day of August A. D. 1916.

JOHN G. G. EKLUNDH.

Witnesses:
 CLYDE ODEN,
 H. J. OSSING.